PROVIDE AIR-FREE EXPANDED CELLULAR POLYMERIC ARTICLE COMPRISING ORIENTED SOFTENABLE THERMOPLASTIC FOAM POLYSTYRENE AND VOLATILE FOAMING AGENT

COMPRESS THE CELLULAR ARTICLE TO COLLAPSE THE FOAM AND FORM CELL-FREE TRANSPARENT HEAT-SHRINKABLE FILM

United States Patent Office 3,755,520
Patented Aug. 28, 1973

3,755,520
METHOD FOR THE PREPARATION OF TRANSPARENT HEAT SHRINKABLE THERMOPLASTIC POLYMERIC FILM FROM FOAMED THERMOPLASTIC POLYMERIC MATERIAL
Joeph A. Cogliano, Baltimore, Md., assignor to W. R. Grace & Co., New York, N.Y.
Filed Oct. 27, 1971, Ser. No. 193,191
Int. Cl. B29c 25/00; B29d 7/02, 27/00
U.S. Cl. 264—53                                   6 Claims

ABSTRACT OF THE DISCLOSURE

The invention disclosed is directed to a process for making biaxially oriented heat-shrinkable film, which includes providing an expanded cellular plastic article formed of a composition comprising a softenable thermoplastic foam polymer, and compressing the article to collapse the foam to an extent such that the resulting relatively dense film shrinks longitudinally and transversely when heated to above the polymer melting point.

---

The present invention relates to preparation of biaxially oriented heat-shrinkable polymeric film from thermoplastic foam polymeric material.

Heat-shrinkable biaxially oriented polymeric film and a number of processes for making the film are known in the art. Generally, however, the prior art processes include providing polymeric film or other relatively dense polymeric articles, orienting the dense film by stretching the film when at its orientation temperature followed by quenching to room temperature. In order to be commercially feasible, many of these known processes are carried out necessarily using specially designed and costly apparatus for heating and stretching film.

Foam polymeric materials in a variety of conventional forms, including sheets, are also known in the art, as are methods for their preparation. For example, it is well known to prepare cellular plastic articles, which may be sheets, of foam polymeric composition by extrusion in which a foamable thermoplastic composition at elevated temperature and pressure is forced through a suitable aperture into a zone of lower pressure, e.g., atmospheric pressure. Upon release of the elevated pressure a low-boiling, volatile liquid or liquefied foaming agent within the foamable composition vaporizes, expanding the composition to form a foam article having a multiplicity of cells. For foaming at a temperature below the lowest self-nucleating temperature of the foamable composition, a solid cell-nucleation agent is advantageously included in the foamable composition. The cells expand until the vaporized foaming agent within the cells ceases to exert greater pressure than atmospheric or other ambient pressure in the lower pressure zone. It is a standard practice to prepare cellular foam polymeric sheets and other articles by processes of the type including the process generally described above using compositions comprising foamable, orientable thermoplastic polymers, e.g., polystyrene. A more detailed description of various aspects of extruding foamable cellular polymeric compositions is set forth in U.S. Pat. 3,502,754.

It has now been found by practice of the present invention that biaxially oriented heat-shrinkable film of thermoplastic polymeric material which may be polystyrene is formed from foam in simple, economical manner. The process of the invention may be carried out without requiring expensive apparatus of the type used in conventional processes for orienting pre-foamed film. There is thus advantageously provided means whereby producers of foam polymer may make heat-shrinkable film with no or minimum added investment in apparatus.

Generally stated, the present invention is for a process of making heat-shrinkable film from cellular plastic articles. The process includes providing an expanded cellular plastic article foamed of a composition comprising a softenable thermoplastic foam polymer, and compressing the article with sufficient force and when at a temperature below the melting point of the polymeric composition, and preferably below the softening point thereof, to substantially collapse the foam, that is to an extent such that heating the resulting relatively dense film to above the melting point effects transverse and longitudinal shrinkage of the film.

Practice of the present invention will become more apparent from the accompanying drawing taken with the detailed description below.

The drawing diagrammatically illustrates a general sequence for making heat-shrinkable film by the practice of the present invention.

In carrying out the present process, it is critical that the provided cellular plastic article, and especially the cells thereof, be substantially free of entrapped gaseous compositions which remain in a gaseous state at the temperature-pressure condition under which the expanded cellular article is compressed. The necessarily excluded compositions include, for example, air; the so-called "non-condensable" gases, e.g., nitrogen, oxygen and helium; mixtures thereof; and the like. Other compositions which must be excluded will be apparent to persons skilled in the art.

In the drawing and the portion of this description which follows, suitable articles for compression into heat-shrinkable films by the present process are referred to simply as air-free articles.

Air-free articles to be compressed in the present process may be provided by extruding, as in an extrusion process of the aforesaid type, almost any orientable thermoplastic polymeric composition which upon extrusion forms expanded cellular articles. In general, articles provided by thus extruding orientable thermoplastic compositions, for example, polystyrene, are sufficiently air-free when made such that the articles may be compressed without requiring removal of the aforesaid necessarily excluded gaseous composition prior to compression. However, if in the time intervening between formation of the article and compression thereof unsuitable gaseous compositions enter in more than minimal amount, at least the excess or intolerable amount of air and/or other gases must be removed from the preformed article to provide the air-free expanded cellular article required in the compression step. However, it is generally not necessary to remove residual volatile foaming agents having atmospheric boiling points above 25° C. When necessary, gaseous composition may be removed prior to compression by applying vacuum to the cellular article until the residual amount of gaseous contaminant is not more than a maximum tolerable amount. Generally, the maximum tolerable amount is in the range from about 0.0001 to about 0.001 part by weight per 100 parts by weight of the article.

Although it is not intended to limit the invention to any particular theory of operation, it is believed that expansion of thermoplastic composition comprising orientable polymeric material to form cellular articles results in orienting the polymer chains parallel to the walls of the cells. It is further believed that in compressing such articles to collapse the foam or cellular structure, the orientation is preserved. According to this theory, the degree of heat-shrinkability of film made by the present process depends in part on the extent of molecular orientation in the expanded cellular article.

In the present process, the foamed cellular article must be compressed when at a relatively low temperature. Too high a temperature results in insufficiently pliable film which is inadequate in many applications in that when folded, and sometimes when merely flexed, the film breaks. Further, higher temperature results in forming film not having adequate heat-shrinkability. The maximum temperature at which expanded sheets may be suitably compressed depends in part on the polymer used and on the time of compression. Generally, however, the compression temperature must be below the melting point or range of the polymer, and preferably below the softening point or range.

The maximum temperature at which foam polystyrene may be suitably formed into heat-shrinkable film without concern for length of time at the temperature is about 80° C. Heat-shrinkable film may be prepared from polystyrene foam at compression temperatures in the range from slightly above 80° C. to about 110° C., provided that the foam is compressed to film in sufficiently short time such that the polymeric molecular orientation of the foam is substantially preserved. Sufficiently short times for compressing polystyrene foam at temperatures in the last mentioned range are generally on the order of about 30 seconds, somewhat shorter times being required at temperatures in the higher end of the range and somewhat longer times being permissible at the lower end. Conveniently, polystyrene may be compressed to heat shrinkable film at room temperature, i.e., about 20° C. to about 30° C.

The pressure applied in compressing suitable foam articles in this process must be at least sufficient to substantially collapse the foam. It is found that the pressure required depends on the composition, density and relative rigidity of the article. In general, a suitable pressure is from about 25,000 to about 100,000 p.s.i. (pounds per square inch), based on the area of a surface of the cellular article. The pressure may be applied using almost any pressuring means. Suitable pressuring means include, for example, die presses and pairs of pinch rolls.

The polymeric compositions of which the cellular expanded articles are formed may include various components such as fillers, stabilizers, antioxidants, flame retardants, dyes, pigments, surfactants and the like.

Practice of the present invention will be further illustrated by the following non-limiting examples. All parts and percentages given are by weight unless indicated otherwise.

EXAMPLE 1

An expanded cellular foam polystyrene sheet, 70 mils in thickness, and having a bulk density of 5 pounds per cubic foot was produced by extruding a foamable composition including about 100 parts polystyrene, about 5 parts n-pentane and about 0.1 part sodium bicarbonate/citric acid in conventional manner. Within 5 minutes after extrusion, the expanded sheet was cooled and placed at 33 to 35° C. on the face of the lower die of a press. The upper die was lowered into contact with the sheet and urged to a position about 3–5 mils above the lower die, squeezing the sheet between the die faces at 30,000 p.s.i. for about 10 minutes, during which time the sheet was formed into a film of about 5 mils in thickness. After retracting the dies, the thus formed transparent essentially non-cellular film was removed. The film exhibited good strength and resisted rupture when flexed and also when folded. The film was placed in a heating bath of glycol at a temperature of about 110–115° C. for about 3 to 5 minutes and thereafter removed. The observed reduction in film surface area and increase in thickness during heating indicated that the film was of excellent heat shrinkable character and useful in shrink-fit packaging applications such as those in which biaxially oriented films have been used.

EXAMPLE 2

An 80-mil thick polystyrene foam sheet was equilibrated with air by storing under ambient conditions for about one month, and thereafter was compressed at 30° C. using the pressing procedure of Example 1. After pressing the sheet for about 10 minutes at a pressure of about 35,000 p.s.i., the dies were retracted and the thus formed film of about 3–5 mils in thickness was removed. The film was of unacceptable mottled appearance with numerous surface irregularities and cell-entrained air.

EXAMPLE 3

A second 80-mil thick foam polystyrene sheet was equilibrated as in Example 2. This sheet was placed in a vacuum chamber under a pressure of about 2 millimeters of mercury absolute for about 2 days, after which the sample was withdrawn and placed on the lower die face of a standard press. After compressing this sheet at 25–30° C. for about 5 minutes under about 37,000 p.s.i. developed by squeezing the sheet between the dies, the resulting film was removed. Observations showed essentially no expanded cells in the film, which was of good transparency. The film was about 1⅞ inches in length, 1⅞ inches in width, and about 4.5 mils in thickness. The film was heated by immersing in a glycol bath at 120° C. for about 1 minute, after which the film was removed. The film was found to shrink in surface area and increase in thickness during heating. Width of the heated film was 13/16 inch, length ⅝ inch, and thickness 65 mils, indicating excellent heat shrinkability for the film. Results of testing the film using an Instron tensile tester in accordance with standard test procedures therefor as shown by the below indicated data:

| Property | Machine direction | Transverse direction |
|---|---|---|
| Total elongation, percent | 36.4 | 10.8 |
| Yield elongation, percent | 4.4 | 4.1 |
| Tensile modulus of elasticity, p.s.i. | 278,015 | 302,745 |
| Yield stress, p.s.i. | 7,788 | 7,508 |
| Tensile stress, p.s.i. | 7,687 | 6,522 |

EXAMPLE 4

The procedure of Example 3 was repeated, except that the temperature of the sheet was about 185° C. at the start of the pressing operation. The sheet was pressed at 37,000 p.s.i. for about 10 minutes, during which time the sheet was compressed to about 5 percent of its original thickness, resulting in a film, the area of which was about 30 percent more than the area of the uncompressed foam sheet. The pressure applied was based on the surface area of the sheet prior to pressing.

The film was unacceptably brittle and ruptured upon being flexed under bending stresses. Heating the film in a glycol bath at 120° for 10 minutes resulted in essentially no film shrinkage.

It is to be understood that the foregoing detailed description is given merely by way of illustration, and that various modifications may be made therein without departing from the spirit or scope of the present invention.

What is claimed is:

1. A process for making heat-shrinkable film, which comprises providing an expanded cellular polymeric article comprising oriented softenable thermoplastic foam polystyrene and volatile foaming agent within the foam polystyrene, and compressing said article at a pressure of from about 25,000 to about 100,000 pounds per square inch to substantially collapse said foam and form the article into heat-shrinkable film, said film being substantially transparent and substantially free of cells, said compression being effected at a temperature in the range from about 20° C. to about 110° C. with compression time not exceeding about 30 seconds in the temperature range from slightly above 80° C. to about 110° C., said cellular article being substantially free of trapped gaseous composition which remains in a gaseous state under the temperature-pressure condition under which compression is effected.

2. The process of claim 1 wherein the article is provided by extrusion expanding a composition comprising orientable softenable thermoplastic foamable polystyrene and a volatile liquid foaming agent.

3. The process of claim 1 wherein said article is provided by removing gaseous composition from a previously prepared expanded cellular polymeric article comprising oriented softenable thermoplastic foam polystyrene and volatile foaming agent within the foam polystyrene to render said previously prepared article substantially free of said gaseous composition, said gaseous composition having entered said previously prepared article by equilibration during a period of time after preparation of said previously prepared article and prior to said compression step, said gaseous composition being a composition which remains in a gaseous state under the temperature-pressure condition under which compression is effected.

4. The process of claim 1 wherein the article is a sheet.

5. The process of claim 1 wherein the article is compressed at a temperature of not more than about 80° C.

6. The process of claim 1 wherein the article is compressed at a temperature of from about 20° C. to about 30° C.

References Cited
UNITED STATES PATENTS

| | | | |
|---|---|---|---|
| 3,277,221 | 10/1966 | Parrish | 264—53 |
| 3,403,203 | 9/1968 | Schirmer | 264—51 |
| 3,344,215 | 9/1967 | De Witz et al. | 264—53 |
| 3,248,462 | 4/1966 | Merrill et al. | 264—53 |
| 3,082,483 | 3/1963 | Bickford | 264—321 |
| 3,334,169 | 8/1967 | Erceg et al. | 264—321 |
| 3,400,810 | 9/1968 | Makowski | 264—Dig. 21 |
| 3,432,380 | 3/1969 | Weber | 264—321 X |

PHILIP E. ANDERSON, Primary Examiner

U.S. Cl. X.R.

161—402, 408, 410; 264—230, 321, 342 R, Dig. 13, Dig. 71